US012634082B2

(12) United States Patent
Wang et al.

(10) Patent No.: US 12,634,082 B2
(45) Date of Patent: May 19, 2026

(54) CHANNEL RECONSTRUCTION METHOD, BASE STATION AND TERMINAL

(71) Applicant: NTT DOCOMO, INC., Tokyo (JP)

(72) Inventors: Xin Wang, Beijing (CN); Xiaolin Hou, Beijing (CN); Anxin Li, Beijing (CN); Lan Chen, Beijing (CN); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 340 days.

(21) Appl. No.: 18/258,913

(22) PCT Filed: Feb. 1, 2021

(86) PCT No.: PCT/CN2021/074691
§ 371 (c)(1),
(2) Date: Jun. 22, 2023

(87) PCT Pub. No.: WO2022/160345
PCT Pub. Date: Aug. 4, 2022

(65) Prior Publication Data
US 2024/0063969 A1      Feb. 22, 2024

(51) Int. Cl.
*H04L 5/00* (2006.01)
*H04B 7/0456* (2017.01)

(52) U.S. Cl.
CPC ......... *H04L 5/0051* (2013.01); *H04B 7/0456* (2013.01)

(58) Field of Classification Search
CPC ..... H04B 7/0456; H04L 5/0051; H04W 72/04
See application file for complete search history.

(56) References Cited

U.S. PATENT DOCUMENTS

2011/0244877 A1* 10/2011 Farajidana ............ H04L 5/0073
455/452.2
2012/0140851 A1* 6/2012 Zhang ................. H04L 25/0222
375/296
(Continued)

FOREIGN PATENT DOCUMENTS

CN        103905101 A    7/2014
WO      2020091665 A1    5/2020

OTHER PUBLICATIONS

English translation of international search report (ISR) for PCT/CN2021/074691; Nov. 3, 2021 (Year: 2021).*
(Continued)

Primary Examiner — Benjamin H Elliott, IV
(74) Attorney, Agent, or Firm — Osha Bergman Watanabe & Burton LLP

(57) ABSTRACT

The present disclosure provides a base station, a terminal and channel reconstruction methods performed by a base station and a terminal. The base station includes: a transmitting unit configured to transmit channel state information reference signals of multiple ports to a terminal, wherein the channel state information reference signals of multiple ports have a first density in frequency domain in one time interval; a receiving unit configured to receive precoding matrix indication information of a first granularity from the terminal; a processing unit configured to determine a channel of a second granularity according to the precoding matrix indication information of the first granularity, and perform downlink precoding on the channel, wherein the second granularity is finer than the first granularity.

7 Claims, 6 Drawing Sheets

Channel reconstruction method 800
performed by a terminal

Receiving a demodulation reference signal (DMRS) of a second density — S801

Performing preliminary channel estimation according to the demodulation reference signal to determine a channel of a third granularity, and performing interpolation and denoising processing on the channel of the third granularity by using a super-resolution network to obtain a channel of a fourth granularity, wherein the fourth granularity is finer than the third granularity — S802

(56) References Cited

U.S. PATENT DOCUMENTS

| | | | | |
|---|---|---|---|---|
| 2013/0242921 A1* | 9/2013 | Kim | H04L 5/0035 | |
| | | | | 370/329 |
| 2014/0064236 A1* | 3/2014 | Nagata | H04B 7/0626 | |
| | | | | 370/329 |
| 2015/0036761 A1* | 2/2015 | Gaal | H04B 7/0469 | |
| | | | | 375/267 |
| 2018/0102821 A1* | 4/2018 | Manolakos | H04L 5/0023 | |
| 2019/0363767 A1* | 11/2019 | Onggosanusi | H04B 7/0632 | |
| 2020/0389879 A1* | 12/2020 | Zhang | H04L 5/0053 | |
| 2021/0119848 A1* | 4/2021 | Ibars Casas | H04L 1/0052 | |
| 2021/0159952 A1* | 5/2021 | Nunome | H04B 7/0456 | |
| 2021/0176097 A1* | 6/2021 | Zheng | H04W 72/30 | |
| 2021/0320823 A1* | 10/2021 | Ernström | H04L 25/0212 | |
| 2021/0344399 A1* | 11/2021 | Levy | H04L 5/0053 | |
| 2021/0367652 A1* | 11/2021 | Wernersson | H04B 7/0634 | |
| 2022/0014251 A1* | 1/2022 | Wang | H04B 7/0417 | |
| 2022/0123793 A1* | 4/2022 | Yin | H04B 7/0639 | |
| 2022/0271900 A1* | 8/2022 | Liu | H04L 5/0078 | |
| 2022/0294499 A1* | 9/2022 | Li | H04B 7/0417 | |
| 2023/0170963 A1* | 6/2023 | Wu | H04B 7/0626 | |
| | | | | 370/329 |
| 2024/0039604 A1* | 2/2024 | Liu | H04B 7/0456 | |
| 2024/0056142 A1* | 2/2024 | Wang | H04B 7/0617 | |
| 2024/0063969 A1* | 2/2024 | Wang | H04L 5/0051 | |

OTHER PUBLICATIONS

International Search Report issued in Application No. PCT/CN2021/074691, mailed Nov. 30, 2021 (5 pages).

Written Opinion issued in Application No. PCT/CN2021/074691, mailed on Nov. 30, 2021 (7 pages).

\* cited by examiner

Terminal 110

Base station 120

First RB      Ports 0-15

Second RB      Ports 16-31

Third RB      Ports 0-15

Fourth RB      Ports 16-31

First RB      Ports 0-7

Second RB      Ports 8-15

Third RB      Ports 16-23

Fourth RB      Ports 24-31

Channel reconstruction method 600
performed by a base station

Channel processing method 700

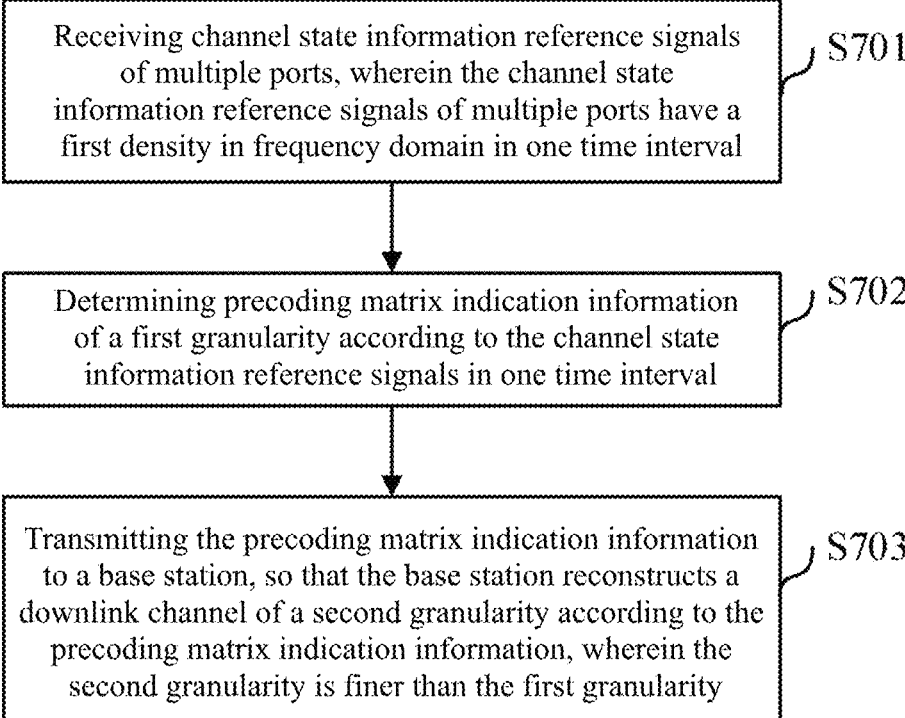

Receiving channel state information reference signals of multiple ports, wherein the channel state information reference signals of multiple ports have a first density in frequency domain in one time interval     S701

Determining precoding matrix indication information of a first granularity according to the channel state information reference signals in one time interval     S702

Transmitting the precoding matrix indication information to a base station, so that the base station reconstructs a downlink channel of a second granularity according to the precoding matrix indication information, wherein the second granularity is finer than the first granularity     S703

FIG. 7

Channel reconstruction method 800
performed by a terminal

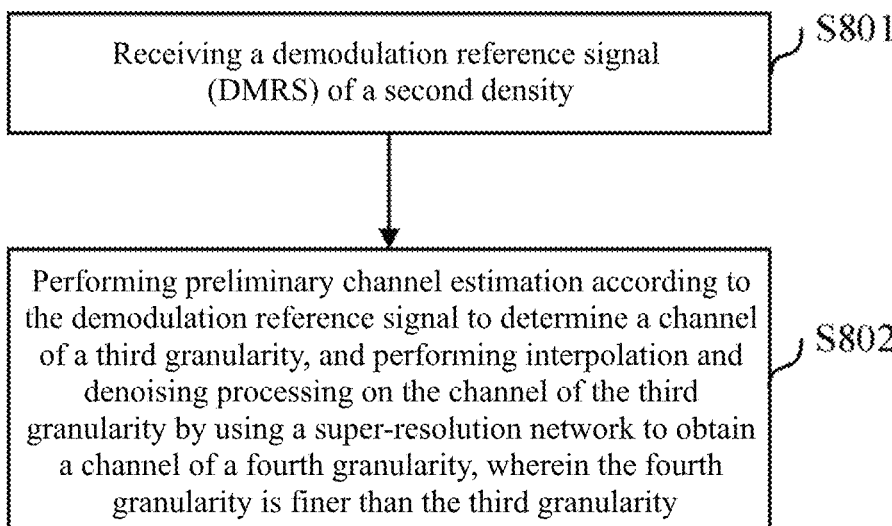

Receiving a demodulation reference signal (DMRS) of a second density — S801

Performing preliminary channel estimation according to the demodulation reference signal to determine a channel of a third granularity, and performing interpolation and denoising processing on the channel of the third granularity by using a super-resolution network to obtain a channel of a fourth granularity, wherein the fourth granularity is finer than the third granularity — S802

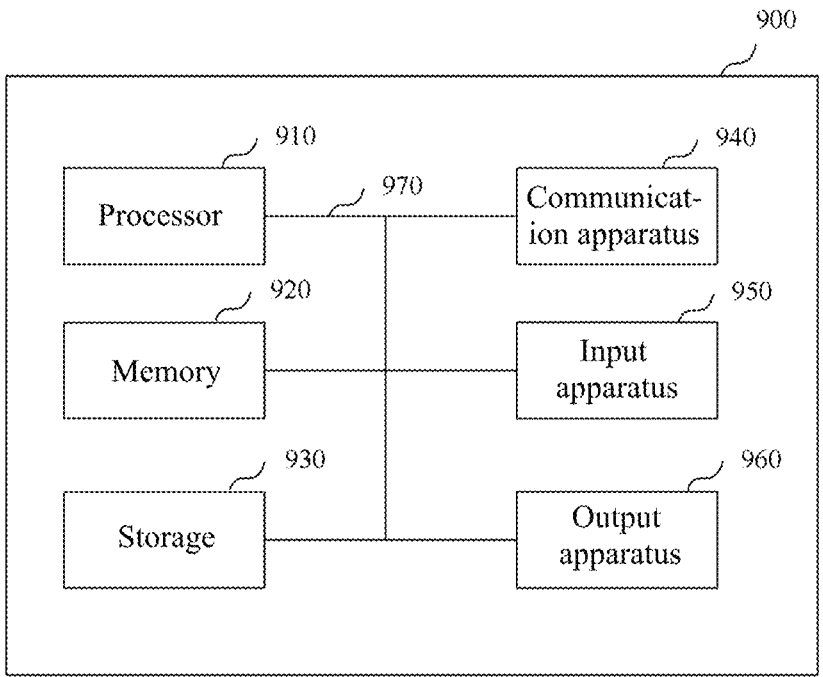

910 Processor
940 Communication apparatus
970
920 Memory
950 Input apparatus
930 Storage
960 Output apparatus

FIG. 9

CHANNEL RECONSTRUCTION METHOD, BASE STATION AND TERMINAL

TECHNICAL FIELD

The present disclosure relates to a field of wireless communication, and more specifically, to a channel reconstruction method and a corresponding base station and terminal.

BACKGROUND

In a communication system, a base station transmits a downlink reference signal to a UE, the UE performs channel estimation according to the downlink reference signal and transmits Precoding Matrix Indication (PMI) information of type I or type II to the base station. The base station may determine corresponding codewords and a combination related to the codewords according to the PMI information transmitted by the UE to reconstruct a channel, and use the reconstructed channel for downlink precoding. At present, type II PMI information transmitted by UE is subband-level PMI information, which leads to large quantization granularity in spatial domain and frequency domain, and large quantization granularity in combination coefficients. Accordingly, the base station reconstructs a subband-level channel based on the subband-level PMI information transmitted by the UE. On the other hand, in a 5G NR system, the base station may perform precoding using the reconstructed channel in unit of Physical Resource Block (PRB) bundling, but the granularity of PRB bundling is usually much smaller than that of PMI information.

For example, in the case where a communication bandwidth between the base station and the UE is 100 MHz and the Subcarrier Spacing (SCS) is 30 kHz, one subband may include 16 Resource Blocks (RBs). The UE may transmit subband-level (i.e., 16 RBs) PMI information of type II. On the other hand, the minimum size of PRB bundling may be 2 RB, which is much smaller than the granularity of PMI information.

In addition, when reconstructing a subband-level channel according to PMI information, it will bring large errors to quantization noise of spatial domain and coefficients, which will reduce the ability of various Multiple-Input Multiple-Output (MIMO) precoding to eliminate interference between users. Therefore, it is necessary to reduce quantization noise.

However, in existing communication systems, if the granularity of Precoding Matrix Indication (PMI) information transmitted by the UE is improved, it is necessary to transmit a Channel State Information Reference Signal (CSI-RS) with a high density to the UE, which increases resource overhead of the reference signal.

Similarly, when the UE demodulates according to a Demodulation Reference Signal (DMRS), the granularity of its reconstructed channel is limited by the density of the received DMRS. However, in existing communication systems, if the density of DMRS is improved, resource overhead of the reference signal needs to be increased.

SUMMARY

According to an aspect of the present disclosure, a base station is provided. The base station comprises: a transmitting unit configured to transmit channel state information reference signals of multiple ports to a terminal, wherein the channel state information reference signals of multiple ports have a first density in frequency domain in one time interval; a receiving unit configured to receive precoding matrix indication information of a first granularity from the terminal; a processing unit configured to determine a channel of a second granularity according to the precoding matrix indication information of the first granularity, and perform downlink precoding on the channel, wherein the second granularity is finer than the first granularity.

According to another aspect of the present disclosure, a terminal is provided. The terminal comprises: a receiving unit configured to receive channel state information reference signals of multiple ports, wherein the channel state information reference signals of multiple ports have a first density in frequency domain in one time interval; a processing unit configured to determine precoding matrix indication information of a first granularity according to the channel state information reference signals in one time interval; and a transmitting unit configured to transmit the precoding matrix indication information to a base station, so that the base station reconstructs a downlink channel of a second granularity according to the precoding matrix indication information, wherein the second granularity is finer than the first granularity.

According to another aspect of the present disclosure, a terminal is provided. The terminal comprises: a receiving unit configured to receive a demodulated reference signal of a second density, a processing unit configured to perform preliminary channel estimation according to the demodulation reference signal to determine a channel of a third granularity, and perform interpolation and denoising processing on the channel of the third granularity by using a super-resolution network to obtain a channel of a fourth granularity, wherein the fourth granularity is finer than the third granularity.

According to another aspect of the present disclosure, a channel reconstruction method performed by a base station is provided, comprising: transmitting channel state information reference signals of multiple ports to a terminal, wherein the channel state information reference signals of multiple ports have a first density in frequency domain in one time interval; receiving precoding matrix indication information of a first granularity from the terminal; determining a channel of a second granularity according to the precoding matrix indication information of the first granularity, and performing downlink precoding on the channel, wherein the second granularity is finer than the first granularity.

According to another aspect of the present disclosure, a channel reconstruction method performed by a terminal is provided, comprising: receiving channel state information reference signals of multiple ports, wherein the channel state information reference signals of multiple ports have a first density in frequency domain in one time interval; determining precoding matrix indication information of a first granularity according to the channel state information reference signals in one time interval; and transmitting the precoding matrix indication information to a base station, so that the base station reconstructs a downlink channel of a second granularity according to the precoding matrix indication information, wherein the second granularity is finer than the first granularity.

According to another aspect of the present disclosure, a channel reconstruction method performed by a terminal is provided, comprising: receiving a demodulation reference signal of a second density; performing preliminary channel estimation according to the demodulation reference signal to determine a channel of a third granularity; performing interpolation and denoising processing on the channel of the third granularity by using a super-resolution network to obtain a channel of a fourth granularity, wherein the fourth granularity is finer than the third granularity.

BRIEF DESCRIPTION OF DRAWINGS

The above and other objects, features and advantages of the present disclosure will become more obvious by describing embodiments of the present disclosure in more detail in conjunction with accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals usually represent like components or steps.

FIG. 7 is a flowchart of a channel reconstruction method performed by a terminal according to an embodiment of the present disclosure.

FIG. 8 is a flowchart of a channel reconstruction method performed by a terminal according to an embodiment of the present disclosure.

FIG. 9 is a schematic diagram of a hardware structure of a device involved according to an embodiment of the present disclosure.

DETAILED DESCRIPTION

Figure 1:
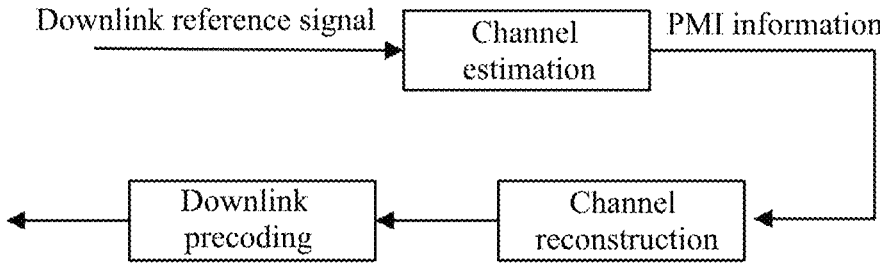
FIG. 1 is a schematic diagram illustrating a base station performing channel reconstruction according to feedback from a terminal in a communication system.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure. In addition, terminals described herein may include various types of terminals, such as User Equipment (UE), mobile terminals (or referred to as mobile stations) or fixed terminals. However, for convenience, terminals and UE are sometimes used interchangeably hereinafter.

FIG. 1 is a schematic diagram illustrating a base station performing channel reconstruction according to feedback from a terminal in a communication system. As shown in FIG. 1, a terminal 110 performs channel estimation according to a downlink reference signal, and obtains Precoding Matrix Indication (PMI) information of type I or type II according to a channel estimation result for transmission to the base station 120. The base station 120 reconstructs a channel according to the PMI information transmitted by the UE, and performs downlink precoding using the reconstructed channel. An ideal spatial-time domain channel H expected by the base station may be expressed by the following Formula (1):

$$H = \sum_{i=1}^{N} \alpha_i F(\tau_i, \varphi_i, \theta_i, \phi_i), \qquad (1)$$

where the spatial-time domain channel H may be regarded as a superposition of N multipath components, with an amplitude of $\alpha_i$ for each multipath component, and may be written as a function F of delay $\tau_i$, horizontal arrival angle $\varphi_i$, vertical arrival angle $\theta_i$ and phase $\phi_i$. At present, it is very difficult to estimate the various parameters in the above formula one by one based on downlink reference signals, making it hard to accurately recover the channel.

Specifically, in a current communication system, the terminal 110 transmits subband-level PMI information of type II. This leads to large quantization granularity in spatial domain and frequency domain, and large quantization granularity in combination coefficients. Accordingly, a channel reconstructed by the base station 120 according to the PMI information is also a subband-level channel, resulting in coarse granularity of the reconstructed channel. On the other hand, in a 5G NR system, the base station may perform precoding using the reconstructed channel in unit of PRB bundling, but the granularity of PRB bundling is usually much smaller than that of PMI information.

In addition, when reconstructing a subband-level channel according to PMI information, it will bring large errors to quantization noise of spatial domain and coefficients, which will reduce the ability of various Multiple-Input Multiple-Output (MIMO) precoding to eliminate interference between users. Therefore, it is necessary to reduce quantization noise.

However, in existing communication systems, if the granularity of Precoding Matrix Indication (PMI) information transmitted by the UE is improved, it is necessary to transmit a Channel State Information Reference Signal (CSI-RS) with a high density to the UE, which increases resource overhead of the reference signal.

Similarly, when the UE demodulates according to a Demodulation Reference Signal (DMRS), the granularity of its reconstructed channel is limited by the density of the received DMRS. However, in existing communication systems, if the density of DMRS is improved, resource overhead of the reference signal needs to be increased.

In an embodiment according to the present disclosure, it is proposed to determine, according to precoding matrix indication information of a first granularity, a channel of a second granularity during channel reconstruction, thus making it possible to reduce signaling overhead while obtaining the channel with finer granularity.

Figure 2:
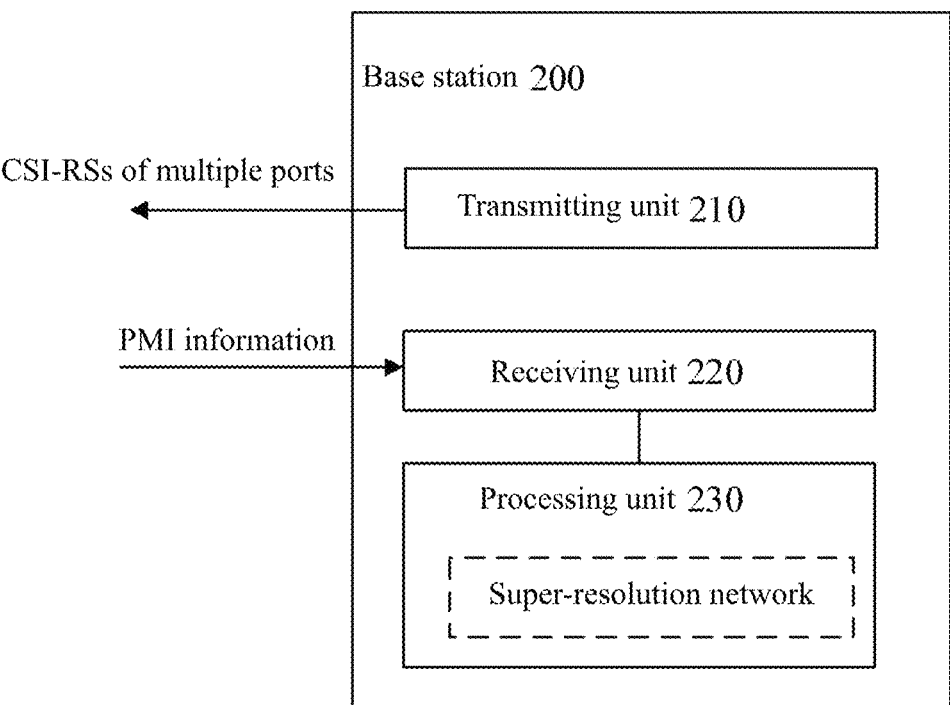
FIG. 2 is a schematic block diagram illustrating a base station according to an embodiment of the present disclosure.

A base station according to an embodiment of the present disclosure will be described below with reference to FIG. 2. FIG. 2 is a schematic block diagram illustrating a base station according to an embodiment of the present disclosure. As shown in FIG. 2, a base station 200 according to an embodiment of the present disclosure may include a transmitting unit 210, a receiving unit 220, and a processing unit 230. In addition to the transmitting unit, the receiving unit and the processing unit, the base station 200 may further include other components. However, since these components are irrelevant to the contents of the embodiments of the present disclosure, illustrations and descriptions thereof are omitted herein.

As shown in FIG. 2, the transmitting unit 210 of the base station 200 transmits channel state information reference signals of multiple ports to a terminal, where the channel state information reference signals of multiple ports have a first density in frequency domain in one time interval. The receiving unit 220 receives precoding matrix indication information of a first granularity from the terminal. Specifically, the precoding matrix indication information of the first granularity is determined by the terminal according to the channel state information reference signals of multiple ports.

Then, the processing unit 230 is configured to determine a channel of a second granularity according to the precoding matrix indication information of the first granularity, and perform downlink precoding on the channel. According to an example of the present disclosure, the base station may perform interpolation and denoising operations in a channel reconstruction process according to the PMI information by a super-resolution network, so that the granularity of the PMI information fed back by the terminal may be a granularity of the PMI information currently used in the communication system, or the granularity is coarser than a granularity of the PMI information currently used in the communication system. Moreover, even if the granularity of the PMI information fed back by the terminal is coarser, a high-precision channel can be obtained by using the super-resolution network. Accordingly, the channel state information reference signals (CSI-RSs) transmitted by the transmitting unit 210 to the terminal for determining the PMI information may also have a low density.

According to an example of the present disclosure, the density currently supported by the 5G NR standard is ½ resource element (RE) per resource block (RB) per port. The transmitting unit 210 may transmit CSI-RSs with the density of ½ resource element per RB. Alternatively, the transmitting unit 210 may transmit CSI-RSs with a density of ¼, ⅛, 1/16 or 1/32 resource element per RB per port.

For example, in one time interval, channel state information reference signals for respective ports do not repeat in at least four consecutive resource blocks in frequency domain. In an example according to the present disclosure, one time interval may be a time period in which the base station transmits CSI-RSs of multiple ports for communication with the terminal at one time. For example, one time interval may be one or more slots, one or more symbol periods, and the like.

Figure 3A:
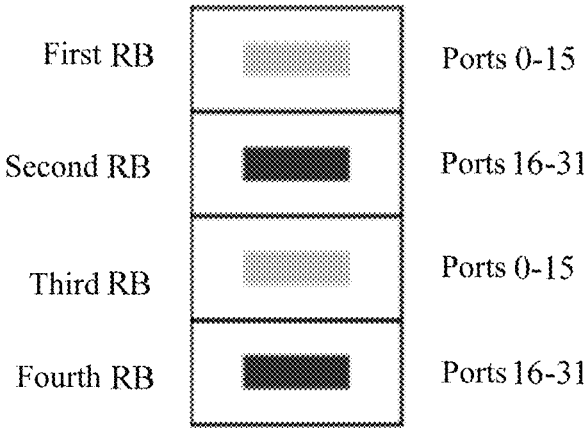
FIG. 3A is a schematic diagram illustrating CSI-RSs of 32 ports transmitted in one slot according to Release 15 of 3GPP standard for 5G NR.

For example, CSI-RSs that the transmitting unit 210 may transmit to the terminal may have a lower density than CSI-RSs in Release 15 of 3GPP standard for 5G NR (New Radio). FIG. 3A is a schematic diagram illustrating CSI-RSs of 32 ports transmitted in one time slot according to Release 15 of 3GPP standard for 5G NR. As shown in FIG. 3A, CSI-RSs of 32 ports are divided into 2 groups. CSI-RSs of ports 0-15 are transmitted in a first resource block (RB), CSI-RSs of ports 16-31 are transmitted in a second RB, and CSI-RSs transmitted in the first and second RBs are repeated in third and fourth RBs, respectively.

As described above, in an example according to the present disclosure, CSI-RS that the transmitting unit 210 may transmit to the terminal may have a lower density than CSI-RS shown in FIG. 3A. For example, in the case of transmitting channel state information reference signals of at least 32 ports in one time interval, the CSI-RSs of multiple ports may be divided into at least 2 groups. And in one time interval, the at least two groups of channel state information reference signals are distributed on the at least four consecutive resource blocks.

Figure 3B:
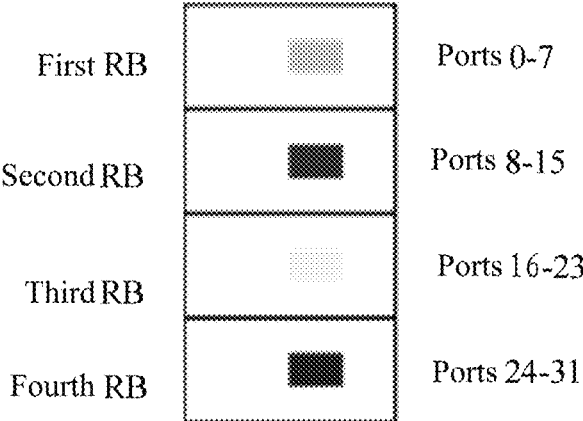
FIG. 3B is a schematic diagram illustrating a transmitting unit transmitting CSI-RSs of 32 ports to a terminal according to an example of the present disclosure.

The density of CSI-RSs transmitted by the transmitting unit 210 to the terminal in an example according to the present disclosure will be described below with reference to FIGS. 3B and 3C. FIG. 3B is a schematic diagram illustrating the transmitting unit transmitting CSI-RSs of 32 ports to the terminal according to an example of the present disclosure. As shown in FIG. 3B, in one time interval, the transmitting unit 210 may transmit the CSI-RSs in a low-density comb structure. Specifically, in one subframe, the CSI-RSs of 32 ports are divided into 4 groups. CSI-RSs of ports 0-7 are transmitted in the first RB, CSI-RSs of ports 8-15 are transmitted in the second RB, CSI-RSs of ports 16-23 are transmitted in the third RB and CSI-RSs of ports 24-31 are transmitted in the fourth RB.

Figure 3C:
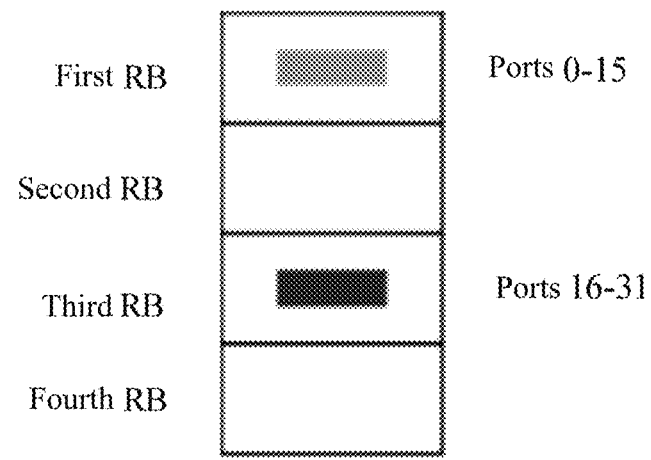
FIG. 3C is a schematic diagram illustrating a transmitting unit transmitting CSI-RSs of 32 ports to a terminal according to another example of the present disclosure.

FIG. 3C is a schematic diagram illustrating the transmitting unit transmitting CSI-RSs of 32 ports to the terminal according to another example of the present disclosure. As shown in FIG. 3C, in one time interval, the transmitting unit 210 may not repeatedly transmit the CSI-RSs of multiple ports. Specifically, the transmitting unit 210 may transmit CSI-RSs on a portion of RBs used for transmitting CSI-RSs in existing communication systems, and not transmit CSI-RSs on other RBs used for transmitting CSI-RSs in existing communication systems, so as to reduce the density of CSI-RSs. As shown in FIG. 3C, CSI-RSs of 32 ports are divided into 4 groups in one subframe. CSI-RSs of ports 0-15 are transmitted in the first RB, CSI-RSs of ports 16-31 are transmitted in the third RB, and no CSI-RS is transmitted in the second RB and the fourth RB.

As described above, the processing unit 230 determines the channel of the second granularity according to the precoding matrix indication information of the first granularity by using the super-resolution network, so that even if the granularity of PMI information fed back from the terminal is coarse, a high-precision channel can be obtained by using the super-resolution network.

According to an example of the present disclosure, the processing unit 230 may perform channel reconstruction according to the precoding matrix indication information to obtain a first channel, and use the super-resolution network to interpolate and denoise the channel of the first granularity to obtain a second channel of the second granularity. For example, the receiving unit 220 may receive subband-level PMI information of type II from the terminal. Specifically, the PMI information of type II may include spatial-domain codeword selection information, amplitude information and phase information of wideband-level and subband-level codeword combination coefficients, and may also include frequency-domain codeword selection information. The processing unit 230 may use the amplitude information and phase information in the PMI information received by the receiving unit 220 to respectively weight the amplitude and phase of the spatial domain (also called "beam domain")-frequency domain channel codewords of multiple beams, and combine weighted vectors to obtain the subband-level first channel. Next, the processing unit 230 uses the super-resolution network to interpolate and denoise the channel of the first granularity to obtain the second channel, where the second channel has the second granularity and the second granularity is finer than the first granularity. For example, as described above, the channel of the first granularity may be a subband-level channel. In this case, the channel of the second granularity may be a subcarrier-level or a resource block (RB)-level channel.

Alternatively, before inputting the first channel of the first granularity into the super-resolution network, the processing unit 230 may preprocess the first channel, so as to facilitate subsequent operations of the super-resolution network. For example, in the case that the first channel is a spatial-frequency domain channel, the processing unit 230 may perform Fourier transform on the first channel to turn the spatial-frequency domain channel into a beam-delay domain channel. In addition, since a channel delay component is mainly concentrated in a header of a delay-domain channel matrix in a beam-delay domain, the processing unit 320 may truncate the delay-domain channel, keep the header, and divide the truncated data into two channels, a real part and an imaginary part, as input of the super-resolution network. By transforming the first channel to be processed into the delay domain and truncating the data, calculation complexity of the super-resolution network can be reduced.

The processing unit 230 may use various super-resolution networks. The first channel of the first granularity may be interpolated and denoised in a similar way to interpolation and denoising of images using a super-resolution network. In addition, high-density reference signals may be used to train the super-resolution network in advance. For example, the transmitting unit 210 may also transmit a high-density reference signal to at least one of a user equipment and a data acquisition device, and receive feedback information for the first channel state information reference signal from at least one of the user equipment and the data acquisition device. The processing unit 230 may use the feedback information for the first channel state information reference signal to train the super-resolution network, so that the super-resolution network learns to obtain a candidate set of channel parameters and function F shown in the above Formula (1) corresponding to the specific feedback information through interpolation and denoising. Therefore, in actual deployment, the processing unit 230 may input the first channel obtained according to the precoding matrix indication information fed back by the terminal into the trained super-resolution network to precisely recover channels.

For example, the processing unit 230 may use at least one of Very Deep Super Resolution (VDSR) network and Cascading Residual Network (CARN) to interpolate and denoise the channel of the first granularity to obtain the second channel. Specifically, the processing unit 230 may use VDSR with 16-20 layers and a convolution kernel size of 3 to interpolate and denoise the channel of the first granularity to obtain the second channel. Because very deep network is beneficial to learning characteristics in channels, channel recovery can be better by using very deep network. Furthermore, a residual network structure may be applied in the very deep super-resolution network according to an example of the present disclosure. Specifically, an input may be superimposed before an output layer to enhance a corresponding relationship between the output and the input.

Alternatively, the processing unit 230 may also use a cascaded residual convolution network formed by mutually introducing a plurality of small convolution networks into the residual structure. In the cascade residual network, each small convolution network may be a 3-layer convolution network with a convolution kernel size of 3. Compared with the very deep super-resolution network, the cascaded residual network can get better performance with less complexity.

Finally, the processing unit 230 performs downlink precoding on the second channel for transmission to the terminal. In the embodiment described in connection with FIG. 3, after the traditional channel reconstruction according to the precoding matrix indication information, the processing unit of the base station uses the super-resolution network to interpolate and denoise the channel of the first granularity to obtain the second channel with finer granularity for downlink precoding.

Furthermore, according to another example of the present disclosure, in addition to the interpolation and denoising processing, a neural network may also be used to perform channel reconstruction according to the precoding matrix indication information of the first granularity received from the terminal. For example, the processing unit 230 may perform channel reconstruction, interpolation and denoising according to the precoding matrix indication information of the first granularity through a neural network including a super-resolution network, to obtain the second channel of the second granularity.

Specifically, the processing unit 230 may perform channel reconstruction, interpolation and denoising according to the precoding matrix indication information of the first granularity through a first subnetwork to obtain the second channel, and perform downlink precoding on the channel of the second granularity, where the second granularity is finer than the first granularity. The first subnetwork may be a first sub neural network.

According to an example of the present disclosure, an input dimension of the first subnetwork may be higher than an output dimension of the first subnetwork. In other words, the first subnetwork adopts high-dimensional input and low-dimensional output design. Because of the high-dimensional input, original information from the precoding matrix indication information can be saved, and because of the low-dimensional output, network complexity and training difficulty can be reduced by dimension reduction in a network processing process.

Specifically, an input of the first subnetwork may be the precoding matrix indication information from the terminal or preprocessed precoding matrix indication information, and the first subnetwork may perform input reconstruction on the precoding matrix indication information. According to an example of the present disclosure, the first subnetwork may weight and combine amplitude and phase of the input data. For example, the precoding matrix indication information may include amplitude information and phase information. Further, the amplitude information may include wideband beam information, wideband amplitude information of each beam, and subband amplitude information of each subband as well as subband phase information of each subband, that the base station communicates with the terminal. The first subnetwork may combine the wideband beam information, wideband amplitude information of each beam and the subband amplitude information of each subband to obtain a channel amplitude matrix. Specifically, the first subnetwork may obtain the channel amplitude matrix in each polarization direction according to polarization directions of beams. In addition, the first subnetwork may obtain a real part matrix and an imaginary part matrix according to the wideband beam information of each beam and the phase information of each subband. Similarly, the first subnetwork may obtain the real part matrix and the imaginary part matrix in each polarization direction according to the polarization directions of the beams. Then, in each polarization direction, the first subnetwork may multiply the channel amplitude matrix with the real part matrix and the imaginary part matrix in that polarization direction, respectively, to obtain a beam-frequency domain channel matrix (also referred to as "beam-frequency domain channel" for short).

For example, the base station 400 communicates with the terminal with beams in two polarization directions. The first subnetwork may obtain channel amplitude matrices A1 and A2 in the two polarization directions, and channel phase matrices (i.e., real part matrices and imaginary part matrices) Pr1, Pr2, Pi1 and Pi2 in two polarization directions. The first subnetwork may obtain the beam-frequency domain channel matrices Hr1, Hr2, Hi1, Hi2 by the following Formula (2):

$$Hr1=A1*Pr1, Hr2=A2*Pr2;$$

$$Hi1=A1*Pi1, Hi2=A2*Pi2 \qquad (2),$$

where the "*" in Formula (2) indicates multiplication of corresponding elements of the matrices.

Next, the first subnetwork may perform Fourier transform on the beam-frequency domain channel, to transform the beam-frequency domain channel to a beam-delay domain channel. In addition, since a channel delay component is mainly concentrated in a header of a delay-domain channel matrix in beam-delay domain, the first subnetwork may truncate the delay-domain channel to reduce dimension of the output.

According to an example of the present disclosure, the first subnetwork may include a dense layer, and perform input reconstruction for the precoding matrix indication information through the dense layer. Specifically, the dense layer weights and combines amplitude and phase of input data to obtain a beam-frequency domain channel, transforms the beam-frequency domain channel into a beam-delay domain channel, and truncates the beam-delay domain channel to reduce output dimension of the network. Alternatively, since the operation required in the weighting and combination process is only to multiply corresponding elements of respective matrices, the corresponding dense layer may be replaced by a partially connected layer, which only connects elements that need to be multiplied directly.

According to another example of the present disclosure, the first subnetwork may further include one or more super-resolution networks for interpolation and denoising. The one or more super-resolution networks may be set before or after the dense layer or partially connected layer. Furthermore, the above-mentioned dense layer or partially connected layer may also be set between multiple super-resolution networks.

For example, a super-resolution network may be set before the dense layer or partially connected layer to interpolate and denoise the precoding matrix indication information from the terminal. Then the interpolated and denoised data are input to the dense layer or partially connected layer for channel reconstruction and dimensionality reduction. As another example, the precoding matrix indication information from the terminal may be input to the dense layer or partially connected layer for channel reconstruction and dimensionality reduction firstly, and then the resulted channel may be input to the super-resolution network for interpolation and denoising. As another example, the precoding matrix indication information from the terminal may be input to a first super-resolution network for denoising. Then, the denoised data is input to the dense layer or partially connected layer for channel reconstruction and dimensionality reduction. Finally, the channel after dimensionality reduction is input to a second super-resolution network for interpolation.

Optionally, according to another example of the present disclosure, the processing unit 230 may also perform at least one of time-domain channel estimation enhancement and time-domain prediction on a plurality of second channels obtained according to precoding matrix indication information transmitted from the same terminal for many times through a second subnetwork. For example, the first subnetwork may process the precoding matrix indication information transmitted by the terminal once (for example, in a single slot), and perform channel reconstruction, interpolation and denoising based on the precoding matrix indication information transmitted by the terminal once. The second subnetwork includes at least one of RNN and LSTM networks, and the second subnetwork may input the precoding matrix indication information transmitted by the same terminal for many times into the RNN/LSTM network to realize at least one of time-domain channel estimation enhancement and time-domain prediction.

Corresponding to the base station described above in connection with FIG. 2, the terminal also receives CSI-RSs with low density, and determines precoding matrix indication information according to the CSI-RSs with low density. A terminal according to an embodiment of the present disclosure will be described below with reference to FIG. 4.

Figure 4:
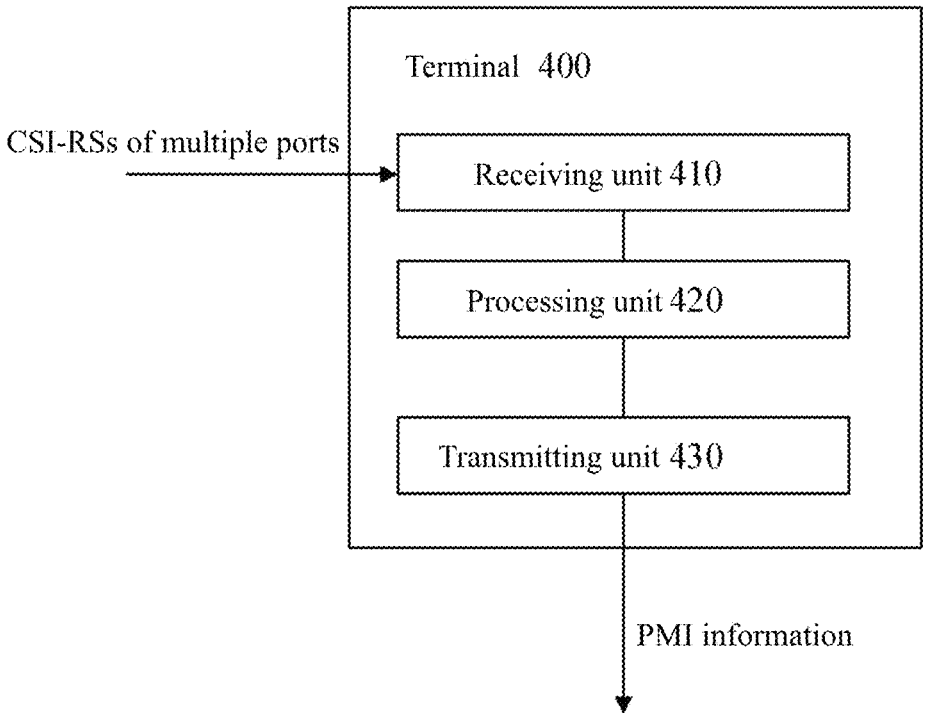
FIG. 4 is a schematic block diagram illustrating a terminal according to an embodiment of the present disclosure.

FIG. 4 is a schematic block diagram illustrating a terminal according to an embodiment of the present disclosure. As shown in FIG. 4, a terminal 400 according to another embodiment of the present disclosure may include a receiving unit 410, a processing unit 420, and a transmitting unit 430. In addition to the transmitting unit, the receiving unit and the processing unit, the terminal 400 may further include other components. However, since these components are irrelevant to the contents of the embodiments of the present disclosure, illustrations and descriptions thereof are omitted herein.

As shown in FIG. 4, the receiving unit 410 receives channel state information reference signals of multiple ports, where the channel state information reference signals of multiple ports have a first density in frequency domain in one time interval. The CSI-RSs of multiple ports with low density have been described above in detail with reference to FIG. 2 and FIG. 3, and thus will not be repeatedly described herein.

The processing unit 420 determines precoding matrix indication information of a first granularity according to the channel state information reference signals in one time interval. The precoding matrix indication information of the first granularity is subband-level precoding matrix indication information. As described above, the base station determines a channel of a second granularity according to the precoding matrix indication information of the first granularity by using a super-resolution network, so that even if the granularity of PMI information fed back by the terminal is coarse, a high-precision channel can be obtained by using the super-resolution network. In this case, the granularity of the PMI information can be further increased. For example, the granularity of the PMI information determined by the processing unit 420 may be coarser than that of PMI information specified in the Release 15 of 3GPP standard for 5G NR.

According to an example of the present disclosure, a size of a subband used when the terminal 400 communicates with its corresponding base station may be increased. For example, the subband may include more resource blocks than a subband in Release 15 of 3GPP standard for 5G NR. Therefore, signaling overhead can be further reduced. For example, the resource blocks included in this subband may be 2 times or more than those included in a subband in Release 15 of 3GPP standard for 5G NR.

According to another example of the present disclosure, a quantization level of feedback for amplitude and phase in PMI information may be increased, for example, to 16-PSK, 32-PSK, while increasing the size of the subband used when the terminal 400 communicates with its corresponding base station. As the size of the subband is increased, signaling overhead can be kept basically unchanged even if the quantization level of feedback for amplitude and phase is increased.

Then, the transmitting unit 430 transmits the precoding matrix indication information to the base station, so that the base station can reconstruct a downlink channel of the second granularity according to the precoding matrix indication information, where the second granularity is finer than the first granularity. As described above, the base station performs interpolation and denoising when performing channel reconstruction according to the precoding matrix indication information of the first granularity, so that even if the granularity of PMI information fed back by the terminal is coarse, a high-precision channel can be obtained by using the super-resolution network. In this case, according to an example of the present disclosure, a period in which the processing unit 420 determines PMI information and the transmitting unit 430 transmits the PMI information to the base station may be extended, thereby further reducing signaling overhead. For example, a period for transmitting the PMI information may be 1.5 times, 2 times, or longer than that for transmitting the PMI information in Release 15 of 3GPP standard for 5G NR. In addition, a period for transmitting CSI-RS may be increased similarly to the period for transmitting the PMI information. For example, the period for transmitting the PMI information and CSI-RS transmission period may be configured to be 960 slot lengths, 1280 slot lengths, or longer.

In the base station and terminal according to the embodiments of the present disclosure described above in connection with FIGS. 2-4, it is proposed to determine the channel of the second granularity according to the precoding matrix indication information of the first granularity during channel reconstruction, thus making it possible to reduce signaling overhead while obtaining channels with finer granularity.

Figure 5:
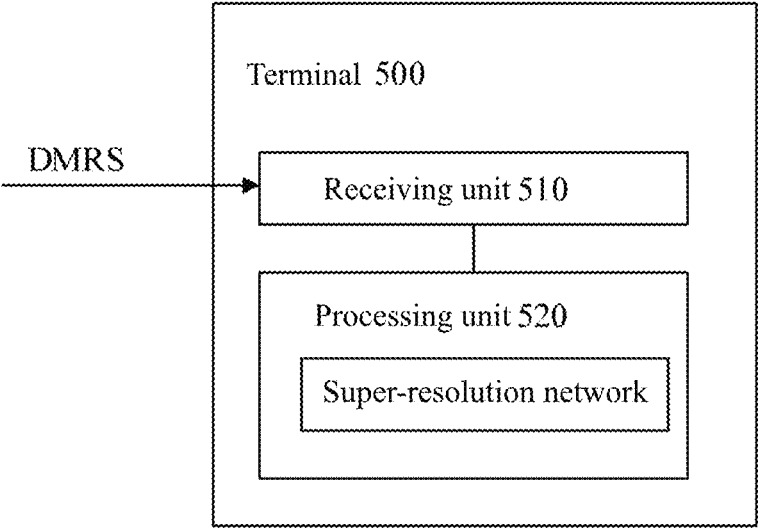
FIG. 5 is a schematic block diagram illustrating a terminal according to another embodiment of the present disclosure.

Similar to determining the channel of the second granularity according to the precoding matrix indication information of the first granularity, according to another embodiment of the present disclosure, it is proposed to perform similar operations on a Demodulation Reference Signal (DMRS) to obtain a high-precision channel according to a low-density DMRS. A terminal according to another embodiment of the present disclosure will be described below with reference to FIG. 5. FIG. 5 is a schematic block diagram illustrating a terminal according to another embodiment of the present disclosure. As shown in FIG. 5, a terminal 500 according to an embodiment of the present disclosure may include a receiving unit 510 and a processing unit 520. In addition to the receiving unit and the processing unit, the terminal 500 may further include other components. However, since these components are irrelevant to the contents of the embodiments of the present disclosure, illustrations and descriptions thereof are omitted herein.

As shown in FIG. 5, the receiving unit 510 may receive a demodulated reference signal (DMRS) of a second density. The processing unit 520 may perform preliminary channel estimation according to the demodulation reference signal to determine a channel with a third granularity, and interpolate and denoise the channel of the third granularity using a super-resolution network to obtain a channel of a fourth granularity, where the fourth granularity is finer than the third granularity. For example, the processing unit 520 may perform preliminary Least Square (LS) channel estimation on the received signal on the DMRS to determine the channel with the third granularity, and then interpolate and denoise the channel of the third granularity using the super-resolution network to obtain the channel of the fourth granularity.

Since the processing unit 520 may perform interpolation and denoising operations in the channel reconstruction process according to the DMRS information through the super-resolution network, a density of DMRS in frequency may be a granularity of DMRS currently used in the communication system, or the density is lower than a frequency-domain density of DMRS currently used in the current communication system. Moreover, even if the frequency-domain density of DMRS is low, a high-precision channel can be obtained by using the super-resolution network.

According to an example of the present disclosure, the density of DMRS may be 1 port per resource block per port or lower. For example, for 12 ports, the density of DMRS may be 1 port per resource block per port; for 6 ports, the density of DMRS may be ½ port per resource block per port. In addition, for example, DMRS may be transmitted using orthogonal cover codes (OCCs). As another example, DMRS may also be transmitted using time-domain orthogonal cover codes (TD-OCCs) or frequency-domain orthogonal cover codes (FD-OCCs).

According to an example of the present disclosure, the processing unit 520 may use various super-resolution networks. The first channel of the first granularity may be interpolated and denoised in a similar way to interpolation and denoising of images using a super-resolution network. In addition, high-density reference signals may be used to train the super-resolution network in advance. Therefore, in actual deployment, the processing unit 520 may input the first channel obtained according to the precoding matrix indication information fed back by the terminal into the trained super-resolution network to precisely recover channels.

For example, the processing unit 520 may use at least one of Very Deep Super Resolution (VDSR) network and Cascading Residual Network (CARN) to interpolate and denoise the channel of the first granularity to obtain the second channel. Specifically, the processing unit 520 may use VDSR with 16-20 layers and a convolution kernel size of 3 to interpolate and denoise the channel of the first granularity to obtain the second channel. Because very deep network is beneficial to learning characteristics in channels, channel recovery can be better by using very deep network. Furthermore, a residual network structure may be applied in the very deep super-resolution network according to an example of the present disclosure. Specifically, an input may be superimposed before an output layer to enhance a corresponding relationship between the output and the input.

Alternatively, the processing unit 520 may also use a cascaded residual convolution network formed by mutually introducing a plurality of small convolution networks into the residual structure. In the cascade residual network, each small convolution network may be a 3-layer convolution network with a convolution kernel size of 3. Compared with the very deep super-resolution network, the cascaded residual network can get better performance with less complexity.

Figure 6:
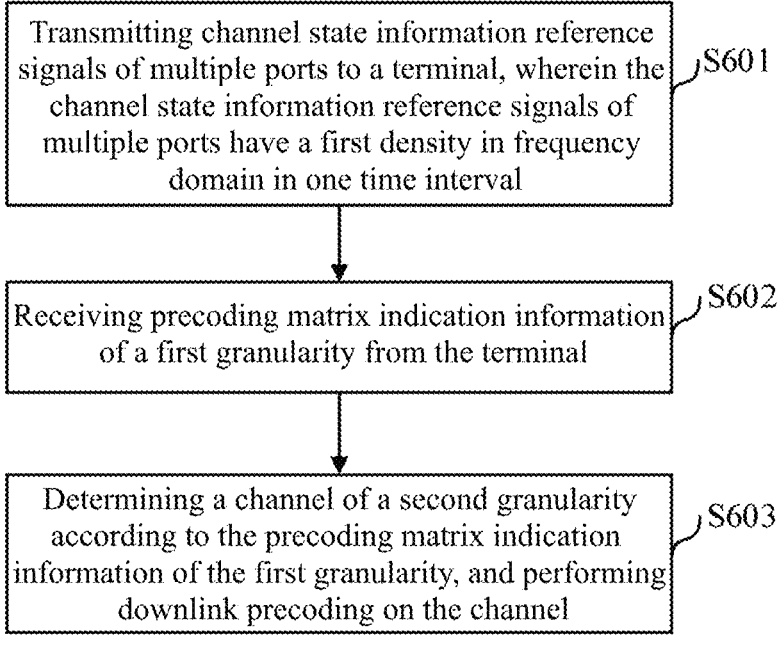
FIG. 6 is a flowchart of a channel reconstruction method performed by a base station according to an embodiment of the present disclosure.

Next, a channel reconstruction method according to an embodiment of the present disclosure will be described with reference to FIG. 6. FIG. 6 is a flowchart of a channel reconstruction method 600 performed by a base station according to an embodiment of the present disclosure. Since steps of the channel processing method 600 correspond to the operations of the base station 200 described above with reference to the figure, a detailed description of the same content is omitted herein for the sake of simplicity.

As shown in FIG. 6, in step S601, channel state information reference signals of multiple ports are transmitted to a terminal, where the channel state information reference signals of multiple ports have a first density in frequency domain in one time interval. In step S602, precoding matrix indication information of a first granularity is received from the terminal. Specifically, the precoding matrix indication information of the first granularity is determined by the terminal according to the channel state information reference signals of multiple ports.

Then, in step S603, a channel of a second granularity is determined according to the precoding matrix indication information of the first granularity, and downlink precoding is performed on the channel. According to an example of the present disclosure, the base station may perform interpolation and denoising operations in a channel reconstruction process according to the PMI information by a super-resolution network, so that the granularity of the PMI information fed back by the terminal may be a granularity of the PMI information currently used in the communication system, or the granularity is coarser than a granularity of the PMI information currently used in the communication system. Moreover, even if the granularity of the PMI information fed back by the terminal is coarser, a high-precision channel can be obtained by using the super-resolution network. Accordingly, the channel state information reference signals (CSI-RSs) transmitted by the transmitting unit 210 to the terminal for determining the PMI information may also have a low density.

According to an example of the present disclosure, the density currently supported by the 5G NR standard is ½ resource element (RE) per resource block (RB) per port. The transmitting unit 210 may transmit CSI-RSs with the density of ½ resource element per RB. Alternatively, the transmitting unit 210 may transmit CSI-RSs with a density of ¼, ⅛, 1/16 or 1/32 resource element per RB per port.

For example, in one time interval, channel state information reference signals for respective ports do not repeat in at least four consecutive resource blocks in frequency domain. In an example according to the present disclosure, one time interval may be a time period in which the base station transmits CSI-RSs of multiple ports for communication with the terminal at one time. For example, one time interval may be one or more slots, one or more symbol periods, and the like. As another example, in step S601, CSI-RSs that may be transmitted to the terminal may have a lower density than CSI-RSs in Release 15 of 3GPP standard for 5G NR (New Radio).

As described above, the channel of the second granularity is determined according to the precoding matrix indication information of the first granularity by using the super-resolution network in step S603, so that even if the granularity of PMI information fed back from the terminal is coarse, a high-precision channel can be obtained by using the super-resolution network.

According to an example of the present disclosure, in step S603, channel reconstruction may be performed according to the precoding matrix indication information to obtain a first channel, and the channel of the first granularity is interpolated and denoised using the super-resolution network to obtain a second channel of the second granularity. For example, in step S603, subband-level PMI information of type II may be received from the terminal. Specifically, the PMI information of type II may include subband-level amplitude information and phase information. In step S603, the amplitude information and phase information in the PMI information received by the receiving unit 220 may be used to respectively weight the amplitude and phase of spatial domain (also called "beam domain")-frequency domain channel codewords of multiple beams, and weighted vectors are combined to obtain the subband-level first channel. Next, in step S603, the super-resolution network is used to interpolate and denoise the channel of the first granularity to obtain the second channel, where the second channel has the second granularity and the second granularity is finer than the first granularity. For example, as described above, the channel of the first granularity may be a subband-level channel. In this case, the channel of the second granularity may be a subcarrier-level or a resource block (RB)-level channel.

Optionally, before inputting the first channel of the first granularity into the super-resolution network, in step S603, the first channel may be preprocessed, so as to facilitate subsequent operations of the super-resolution network. For example, in the case that the first channel is a spatial-frequency domain channel, Fourier transform may be performed on the first channel in step S603 to turn the spatial-frequency domain channel into a beam-delay domain channel. In addition, since a channel delay component is mainly concentrated in a header of a delay-domain channel matrix in a beam-delay domain, in step S603, the delay-domain channel may be truncated, the header is kept, and the truncated data is divided into two channels, a real part and an imaginary part, as input of the super-resolution network. By transforming the first channel to be processed into the delay domain and truncating the data, calculation complexity of the super-resolution network can be reduced.

In step S603, various super-resolution networks may be used. The first channel of the first granularity may be interpolated and denoised in a similar way to interpolation and denoising of images using a super-resolution network. In addition, high-density reference signals may be used to train the super-resolution network in advance.

In step S603, downlink precoding may also be performed on the second channel for transmission to the terminal. In the embodiment described in connection with FIG. 3, after the traditional channel reconstruction according to the precoding matrix indication information, the processing unit of the base station uses the super-resolution network to interpolate and denoise the channel of the first granularity to obtain the second channel with finer granularity for downlink precoding.

Furthermore, according to another example of the present disclosure, in addition to the interpolation and denoising processing, a neural network may also be used to perform channel reconstruction according to the precoding matrix indication information of the first granularity received from the terminal. For example, in step S603, channel reconstruction, interpolation and denoising may be performed according to the precoding matrix indication information of the first granularity through a neural network including a super-resolution network, to obtain the second channel of the second granularity.

Specifically, in step S603, channel reconstruction, interpolation and denoising may be performed according to the precoding matrix indication information of the first granularity through a first subnetwork to obtain the second channel, and downlink precoding may be performed on the channel of the second granularity, where the second granularity is finer than the first granularity. The first subnetwork may be a first sub neural network.

According to an example of the present disclosure, an input dimension of the first subnetwork may be higher than an output dimension of the first subnetwork. In other words, the first subnetwork adopts high-dimensional input and low-dimensional output design. Because of the high-dimensional input, original information from the precoding matrix indication information can be saved, and because of the low-dimensional output, network complexity and training difficulty can be reduced by dimension reduction in a network processing process.

Specifically, an input of the first subnetwork may be the precoding matrix indication information from the terminal or preprocessed precoding matrix indication information, and the first subnetwork may perform input reconstruction on the precoding matrix indication information. According to an example of the present disclosure, the first subnetwork may weight and combine amplitude and phase of the input data. For example, the precoding matrix indication information may include amplitude information and phase information. Further, the amplitude information may include wideband beam information, wideband amplitude information of each beam, and subband amplitude information of each subband as well as subband phase information of each subband, that the base station communicates with the terminal. The first subnetwork may combine the wideband beam information, wideband amplitude information of each beam and the subband amplitude information of each subband to obtain a channel amplitude matrix. Specifically, the first subnetwork may obtain the channel amplitude matrix in each polarization direction according to polarization directions of beams. In addition, the first subnetwork may obtain a real part matrix and an imaginary part matrix according to the wideband beam information of each beam and the phase information of each subband. Similarly, the first subnetwork may obtain the real part matrix and the imaginary part matrix in each polarization direction according to the polarization directions of the beams. Then, in each polarization direction, the first subnetwork may multiply the channel amplitude matrix with the real part matrix and the imaginary part matrix in that polarization direction, respectively, to obtain a beam-frequency domain channel matrix (also referred to as "beam-frequency domain channel" for short).

Next, the first subnetwork may perform Fourier transform on the beam-frequency domain channel, to transform the beam-frequency domain channel to a beam-delay domain channel. In addition, since a channel delay component is mainly concentrated in a header of a delay-domain channel matrix in beam-delay domain, the first subnetwork may truncate the delay-domain channel to reduce dimension of the output.

According to an example of the present disclosure, the first subnetwork may include a dense layer, and perform input reconstruction for the precoding matrix indication information through the dense layer. Specifically, the dense layer weights and combines amplitude and phase of input data to obtain a beam-frequency domain channel, transforms the beam-frequency domain channel into a beam-delay domain channel, and truncates the beam-delay domain channel to reduce output dimension of the network. Alternatively, since the operation required in the weighting and combination process is only to multiply corresponding elements of respective matrices, the corresponding dense layer may be replaced by a partially connected layer, which only connects elements that need to be multiplied directly.

According to another example of the present disclosure, the first subnetwork may further include one or more super-resolution networks for interpolation and denoising. The one or more super-resolution networks may be set before or after the dense layer or partially connected layer. Furthermore, the above-mentioned dense layer or partially connected layer may also be set between multiple super-resolution networks.

Optionally, according to another example of the present disclosure, the method in FIG. 6 may further include performing at least one of time-domain channel estimation enhancement and time-domain prediction on a plurality of second channels obtained according to precoding matrix indication information transmitted from the same terminal for many times through a second subnetwork. For example, the first subnetwork may process the precoding matrix indication information transmitted by the terminal once (for example, in a single slot), and perform channel reconstruction, interpolation and denoising based on the precoding matrix indication information transmitted by the terminal once. The second subnetwork includes at least one of RNN and LSTM networks, and the second subnetwork may input the precoding matrix indication information transmitted by the same terminal for many times into the RNN/LSTM network to realize at least one of time-domain channel estimation enhancement and time-domain prediction.

Corresponding to the method described above in connection with FIG. 6, in a method performed by a terminal, CSI-RSs with low density are also received, and precoding matrix indication information is determined according to the CSI-RSs with low density. A channel reconstruction method performed by a terminal according to an embodiment of the present disclosure will be described below with reference to FIG. 7. FIG. 7 is a flowchart of a channel reconstruction method 700 performed by a terminal according to an embodiment of the present disclosure. Since steps of the channel processing method 700 correspond to the operations of the terminal 400 described above with reference to the figure, a detailed description of the same content is omitted herein for the sake of simplicity.

As shown in FIG. 7, in step S701, channel state information reference signals of multiple ports are received, where the channel state information reference signals of multiple ports have a first density in frequency domain in one time interval. The CSI-RSs of multiple ports with low density have been described above in detail with reference to FIG. 2 and FIG. 3, and thus will not be repeatedly described herein.

In step S702, precoding matrix indication information of a first granularity is determined according to the channel state information reference signals in one time interval. The precoding matrix indication information of the first granularity is subband-level precoding matrix indication information. As described above, the base station determines a channel of a second granularity according to the precoding matrix indication information of the first granularity by using a super-resolution network, so that even if the granularity of PMI information fed back by the terminal is coarse, a high-precision channel can be obtained by using the super-resolution network. In this case, the granularity of the PMI information can be further increased. For example, the granularity of the PMI information determined by in step S702 may be coarser than that of PMI information specified in the Release 15 of 3GPP standard for 5G NR.

According to an example of the present disclosure, a size of a subband used when the terminal 400 communicates with its corresponding base station may be increased. For example, the subband may include more resource blocks than a subband in Release 15 of 3GPP standard for 5G NR. Therefore, signaling overhead can be further reduced. For example, the resource blocks included in this subband may be 2 times or more than those included in a subband in Release 15 of 3GPP standard for 5G NR.

According to another example of the present disclosure, a quantization level of feedback for amplitude and phase in PMI information may be increased, for example, to 16-PSK, 32-PSK, while increasing the size of the subband used when the terminal communicates with its corresponding base station. As the size of the subband is increased, signaling overhead can be kept basically unchanged even if the quantization level of feedback for amplitude and phase is increased.

Then, in step S703, the precoding matrix indication information may be transmitted to the base station, so that the base station can reconstruct a downlink channel of the second granularity according to the precoding matrix indication information, where the second granularity is finer than the first granularity. As described above, the base station performs interpolation and denoising when performing channel reconstruction according to the precoding matrix indication information of the first granularity, so that even if the granularity of PMI information fed back by the terminal is coarse, a high-precision channel can be obtained by using the super-resolution network. In this case, according to an example of the present disclosure, a period for determining PMI information and transmitting the PMI information to the base station may be extended, thereby further reducing signaling overhead. For example, a period for transmitting the PMI information may be 1.5 times, 2 times, or longer than that for transmitting the PMI information in Release 15 of 3GPP standard for 5G NR. In addition, a period for transmitting CSI-RS may be increased similarly to the period for transmitting the PMI information.

In the channel reconstruction method according to the embodiments of the present disclosure described above in connection with FIGS. 6-7, it is proposed to determine the channel of the second granularity according to the precoding matrix indication information of the first granularity during channel reconstruction, thus making it possible to reduce signaling overhead while obtaining channels with finer granularity.

Similar to determining the channel of the second granularity according to the precoding matrix indication information of the first granularity, according to another embodiment of the present disclosure, it is proposed to perform similar operations on a Demodulation Reference Signal (DMRS) to obtain a high-precision channel according to a low-density DMRS. A channel reconstruction method based on DMRS performed by a terminal according to another embodiment of the present disclosure will be described below with reference to FIG. 8. FIG. 8 is a flowchart of a channel reconstruction method 800 performed by a terminal according to an embodiment of the present disclosure. Since steps of the channel processing method 800 correspond to the operations of the terminal 500 described above with reference to the figure, a detailed description of the same content is omitted herein for the sake of simplicity.

As shown in FIG. 8, in step S801, a demodulated reference signal (DMRS) of a second density is received. In step S802, preliminary channel estimation is performed according to the demodulation reference signal to determine a channel with a third granularity, and the channel of the third granularity is interpolated and denoised using a super-resolution network to obtain a channel of a fourth granularity, where the fourth granularity is finer than the third granularity. For example, in step S802, preliminary Least Square (LS) channel estimation may be performed on the received signal on the DMRS to determine the channel with the third granularity, and then the channel of the third granularity is interpolated and denoised using the super-resolution network to obtain the channel of the fourth granularity.

Since interpolation and denoising operations may be performed in the channel reconstruction process according to the DMRS information through the super-resolution network in step S802, a density of DMRS in frequency may be a granularity of DMRS currently used in the communication system, or the density is lower than a frequency-domain density of DMRS currently used in the current communication system. Moreover, even if the frequency-domain density of DMRS is low, a high-precision channel can be obtained by using the super-resolution network.

According to an example of the present disclosure, the density of DMRS may be 1 port per resource block per port or lower. For example, for 12 ports, the density of DMRS may be 1 port per resource block per port; for 6 ports, the density of DMRS may be ½ port per resource block per port. In addition, for example, DMRS may be transmitted using orthogonal cover codes (OCCs). As another example, DMRS may also be transmitted using time-domain orthogonal cover codes (TD-OCCs) or frequency-domain orthogonal cover codes (FD-OCCs).

According to an example of the present disclosure, in step S802, various super-resolution networks may be used. The first channel of the first granularity may be interpolated and denoised in a similar way to interpolation and denoising of images using a super-resolution network. In addition, high-density reference signals may be used to train the super-resolution network in advance. Therefore, in actual deployment, the first channel obtained according to the precoding matrix indication information fed back by the terminal may be input into the trained super-resolution network to precisely recover channels in step S802.

For example, in step S802, at least one of Very Deep Super Resolution (VDSR) network and Cascading Residual Network (CARN) may be used to interpolate and denoise the channel of the first granularity to obtain the second channel. Specifically, in step S802, VDSR with 16-20 layers and a convolution kernel size of 3 may be used to interpolate and denoise the channel of the first granularity to obtain the second channel. Because very deep network is beneficial to learning characteristics in channels, channel recovery can be better by using very deep network. Furthermore, a residual network structure may be applied in the very deep super-resolution network according to an example of the present disclosure. Specifically, an input may be superimposed before an output layer to enhance a corresponding relationship between the output and the input.

Alternatively, in step S802, a cascaded residual convolution network formed by mutually introducing a plurality of small convolution networks into the residual structure may also be used. In the cascade residual network, each small convolution network may be a 3-layer convolution network with a convolution kernel size of 3. Compared with the very deep super-resolution network, the cascaded residual network can get better performance with less complexity.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

For example, a first network element in an embodiment of the present disclosure may function as a computer that executes the processes of the wireless communication method of the present disclosure. FIG. 9 is a schematic diagram of a hardware structure of a device 900 (a base station, a terminal) involved in an embodiment of the present disclosure. The above device 900 (a base station or terminal) may be constituted as a computer apparatus that physically comprises a processor 910, a memory 920, a storage 930, a communication apparatus 940, an input apparatus 950, an output apparatus 960, a bus 970 and the like In addition, in the following description, terms such as "apparatus" may be replaced with circuits, devices, units, and the like. The hardware structure of the first network element may include one or more of the respective apparatuses shown in the figure, or may not include a part of the apparatuses.

For example, only one processor 910 is illustrated, but there may be multiple processors. Furthermore, processes may be performed by one processor, or processes may be performed by more than one processor simultaneously, sequentially, or with other methods. In addition, the processor 910 may be installed by more than one chip.

Respective functions of any of the device 900 may be implemented, for example, by reading specified software (program) on hardware such as the processor 910 and the memory 920, so that the processor 910 performs computations, controls communication performed by the communication apparatus 940, and controls reading and/or writing of data in the memory 920 and the storage 330.

The processor 910, for example, operates an operating system to control the entire computer. The processor 910 may be constituted by a Central Processing Unit (CPU), which includes interfaces with peripheral apparatuses, a control apparatus, a computing apparatus, a register and the like. For example, the processing unit described above may be implemented by the processor 910.

In addition, the processor 910 reads programs (program codes), software modules and data and the like from the storage 930 and/or the communication apparatus 940 to the memory 920, and execute various processes according to them. As for the program, a program causing computers to execute at least a part of the operations described in the above embodiments may be employed. For example, the processing unit of the first network element may be implemented by a control program stored in the memory 920 and operated by the processor 910, and other functional blocks may also be implemented similarly.

The memory 920 is a computer-readable recording medium, and may be constituted, for example, by at least one of a Read Only Memory (ROM), an Erasable Programmable ROM (EPROM), an Electrically EPROM (EE- PROM), a Random Access Memory (RAM) and other appropriate storage media. The memory 920 may also be referred to as a register, a cache, a main memory (a main storage apparatus) and the like. The memory 920 may store executable programs (program codes), software modules and the like for implementing a method involved in an embodiment of the present disclosure.

The storage 930 is a computer-readable recording medium, and may be constituted, for example, by at least one of a flexible disk, a Floppy® disk, a magneto-optical disk (e.g., a Compact Disc ROM (CD-ROM) and the like, a digital versatile disk, a Blu-ray® disk), a removable disk, a hard driver, a smart card, a flash memory device (e.g., a card, a stick and a key driver), a magnetic stripe, a database, a server, and other appropriate storage media. The storage 930 may also be referred to as an auxiliary storage apparatus.

The communication apparatus 940 is a hardware (transceiver device) performing communication between computers via a wired and/or wireless network, and is also referred to as a network device, a network controller, a network card, a communication module and the like, for example. The communication apparatus 940 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 940.

The input apparatus 950 is an input device (e.g., a keyboard, a mouse, a microphone, a switch, a button, a sensor and the like) that receives input from the outside. The output apparatus 960 is an output device (e.g., a display, a speaker, a Light Emitting Diode (LED) light and the like) that performs outputting to the outside. In addition, the input apparatus 950 and the output apparatus 960 may also be an integrated structure (e.g., a touch screen).

Furthermore, the respective apparatuses such as the processor 910 and the memory 920 are connected by the bus 970 that communicates information. The bus 970 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 710 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Blocks (MIBs), System Information Blocks (SIGs), etc.), Medium Access Control (MAC) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by a first communication device and a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM® R), Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. A base station, comprising:
a transceiver configured to:
    transmit channel state information reference signals of multiple ports to a terminal, wherein the channel state information reference signals of multiple ports have a first density in frequency domain in one time interval, and
    receive precoding matrix indication information of a first granularity from the terminal; and
a processor configured to perform channel reconstruction according to the precoding matrix indication information of the first granularity to determine a first channel, and use a super-resolution network to interpolate and denoise the first channel of the first granularity to determine a second channel of a second granularity, and perform downlink precoding on the second channel,
    wherein the second granularity is finer than the first granularity.

2. The base station of claim 1, wherein the channel state information reference signals of multiple ports are low-density channel state information reference signals in frequency domain.

3. The base station of claim 2, wherein
the transceiver transmits channel state information reference signals of at least 32 ports in one time interval;
the channel state information reference signals are divided into at least two groups according to the multiple ports; and
the at least two groups of channel state information reference signals are distributed on at least four consecutive resource blocks in one time interval.

4. A terminal, comprising:
a transceiver configured to receive channel state information reference signals of multiple ports, wherein the channel state information reference signals of multiple ports have a first density in frequency domain in one time interval; and
a processor configured to determine precoding matrix indication information of a first granularity according to the channel state information reference signals in one time interval,
    wherein the transceiver is further configured to transmit the precoding matrix indication information to a base station, so that the base station performs channel reconstruction according to the precoding matrix indication information of the first granularity to determine a first channel and uses a super-resolution network to interpolate and denoise the first channel of the first granularity to determine a second channel of a second granularity, and wherein the second granularity is finer than the first granularity.

5. The terminal of claim 4, wherein the precoding matrix indication information of the first granularity is precoding matrix indication information with a coarse granularity.

6. A terminal, comprising:

a transceiver configured to receive a demodulation reference signal of a second density; and a processor configured to perform preliminary channel estimation according to the demodulation reference signal to determine a channel of a third granularity, and perform interpolation and denoising processing on the channel of the third granularity by using a super-resolution network to obtain a channel of a fourth granularity, wherein the fourth granularity is finer than the third granularity.

7. The terminal of claim 6, wherein the demodulation reference signal is a channel state information reference signal with a low density in frequency domain.

\* \* \* \* \*